(12) United States Patent
Royle

(10) Patent No.: US 7,567,875 B2
(45) Date of Patent: *Jul. 28, 2009

(54) ENHANCED SONDE RECOGNITION

(75) Inventor: John Mark Royle, Exeter (GB)

(73) Assignee: Radiodetection Limited, Bristol (GB)

( * ) Notice: Subject to any disclaimer, the term of this patent is extended or adjusted under 35 U.S.C. 154(b) by 581 days.

This patent is subject to a terminal disclaimer.

(21) Appl. No.: 11/249,749

(22) Filed: Oct. 14, 2005

(65) Prior Publication Data

US 2007/0084636 A1  Apr. 19, 2007

(51) Int. Cl.
  *G06F 19/00*  (2006.01)
  *G01V 3/08*  (2006.01)
(52) U.S. Cl. .................. 702/65; 324/247; 324/326; 324/329; 702/190
(58) Field of Classification Search .............. 702/65, 702/66, 75, 127, 189–194, 197; 375/232, 375/259, 345; 324/326, 329; 340/333, 572.5, 340/854; 175/45, 259
See application file for complete search history.

(56) References Cited

U.S. PATENT DOCUMENTS

| | | | |
|---|---|---|---|
| 5,418,460 A * | 5/1995 | Cloutier et al. ............. 324/247 |
| 5,952,947 A | 9/1999 | Nussbaum et al. |
| 6,617,856 B1 * | 9/2003 | Royle et al. ................. 324/329 |
| 6,968,296 B2 | 11/2005 | Royle ......................... 702/190 |
| 7,009,399 B2 * | 3/2006 | Olsson et al. ............... 324/326 |
| 7,310,584 B2 * | 12/2007 | Royle .......................... 702/65 |
| 2004/0246034 A1 | 12/2004 | Daishin et al. |

FOREIGN PATENT DOCUMENTS

WO  WO 03/012483 A1  2/2003

* cited by examiner

*Primary Examiner*—John H Le
(74) *Attorney, Agent, or Firm*—Baker & Hostetler LLP

(57) ABSTRACT

A detector for locating a sonde is comprised of a plurality of antennas, a corresponding number of signal isolator modules 1 and a geometrical evaluation module. The magnetic signal generated by the sonde has a fundamental frequency and harmonic frequencies. A frequency spectrum analyzer 29 which forms part of the signal isolator module 1 has frequency bins which are aligned with the fundamental frequency and a plurality of harmonic frequencies of the magnetic signal produced by the sonde. The frequency bins follow variations in the frequency of the magnetic signal produced by the sonde which allows the detector to detect the sonde at a separation of up to 30m.

35 Claims, 7 Drawing Sheets

ENHANCED SONDE RECOGNITION

FIELD OF THE INVENTION

The present invention relates to apparatus and a computer program for and a method of digital signal processing, and in particular to apparatus and a computer program for and a method of sonde recognition.

BACKGROUND OF THE INVENTION

When laying a new utility cable or pipe underground, an underground drill can be used to avoid the need to dig and fill-in a trench. When performing such trenchless drilling, the drill operator must be aware of the exact location of the drill head, in order to steer the drill in the correct direction and to avoid buried utilities or underground structures.

To locate the drill head, a sonde can be inserted therein. The sonde generates an alternating dipole magnetic field with a frequency of oscillation in the range 200 Hz to 83 KHz. At the lower of these frequencies, attenuation due to the drill bit enclosure and distortion due to ground effects are minimised. The magnetic signal can be modulated to transmit useful information, such as data relating to the tilt and roll angle of the sonde, a temperature reading and/or a battery life reading.

The magnetic field produced by the sonde is detectable by a portable detector, which can be hand-held or mounted on a tripod. The detector incorporates an array of highly sensitive antennas which detect electromagnetic signals from 50 Hz up to around 250 kHz. The signal generated in each antenna is processed to identify and isolate the sonde signal. The field magnitude, field gradient and relative phase of the sonde signal detected at each antenna are evaluated and these measurements are processed to determine the location and orientation of the sonde and associated drill head. The detector incorporates a digital signal processor (DSP) to process the received electromagnetic signals. The degree of complexity of the algorithms used in the DSP depends on a number of factors, including the power available from the detector's batteries, the requirement to provide a reasonable drilling speed and the desired degree of accuracy when pinpointing the sonde.

Prior art apparatus for sonde recognition and location, comprises an analogue or digital receiver of either superheterodyne or homodyne architecture, a phase sensitive signal processing system and use of a complex discrete Fourier transform (CDFT) to arbitrate the sonde present criterion. Such processes were limited to measuring the signal to noise ratio (SNR) of the carrier frequency with respect to the broadband noise floor. The effects of use of Blackman or Hamming window filters to suppress the spectral leakage which is inherent to the CDFT algorithm for frequency components which are not an integral number of periods within the transform length are shown in FIG. 6 which shows a sonde spectrum processed through a fast Fourier transform (FFT) using a Hamming window. Comparison with FIG. 3, which shows a typical frequency spectrum of a magnetic signal produced by a sonde, illustrates the advantage of the window function which has pushed the overall noise floor down by ~6 dB. Although useful, these window functions introduce distortion and non-linearity into the process which is undesirable.

It is an aim of the present invention-to provide apparatus and a computer program for and a method of improving the sensitivity of a detector for a sonde, to provide more accurate and faster location of a sonde and to provide detection of a sonde at a greater separation between a sonde and a detector, compared with that achievable with currently available detectors. This enhanced sonde recognition is achievable without a significant increase in power consumption by the detector, so that new algorithm does not adversely affect the battery life of the device.

Whereas the maximum distance at which currently available sondes can be detected is around 20 m, by using a new algorithm the present invention can achieve a maximum working separation between a sonde and a detector of around 28 m, with a drill speed comparable to the drill speed achievable with currently available sondes at a 20 m separation. As the strength of the magnetic field produced by a sonde at a distance along the axis of the magnetic field is governed by an inverse cube relationship, such an increase in the maximum working separation is a substantial improvement.

SUMMARY OF THE INVENTION

A first aspect of the present invention provides a detector for detecting an oscillating magnetic signal produced by a sonde, the magnetic signal having a fundamental frequency and harmonic frequencies, the detector comprising a frequency spectrum analyser having frequency bins and an output, wherein the frequency bins of the frequency spectrum analyser are substantially aligned with the fundamental frequency and a plurality of the harmonic frequencies of the magnetic signal produced by the sonde.

FIG. 3 shows a typical frequency spectrum of a magnetic signal produced by a sonde, the signal having a carrier frequency of 8192 Hz. The magnetic signal is modulated with a "Pseudo Manchester Bi-phase" 100% amplitude modulation scheme, at 37.5 bits per second, as described below. To recognise the presence of the sonde, a detector should identify this spectrum pattern. Therefore, a detector for detecting the presence of a sonde requires analysis of the signal across a bandwidth which is large (~100 Hz) compared to the bandwidth used to identify the position of the sonde (<1 Hz), to ensure that energy from data modulation is visible in the side bands around the carrier frequency.

The detector should arbitrate that a signal originates from a sonde and not from a source of interference, e.g. a high order harmonic frequency from a mains electricity supply grid. Furthermore, such interference could appear to be phase correlated, which could erroneously cause the detector to track phase with respect to the supply grid and not the sonde.

The detector analyses the frequency spectrum with a hyperfine resolution of between 0.01 Hz and 0.1 Hz around the carrier and dominant side band frequencies. By aligning the frequency bins of the frequency spectrum analyser with the fundamental frequency and a plurality of the harmonic frequencies of the magnetic signal produced by the sonde, the SNR reading for the fundamental frequency and harmonic frequencies can be maximised for a given signal.

In an embodiment of the invention, the frequency bins follow frequency variation of the magnetic signal produced by the sonde. One of the key properties of sonde location is the quality and integrity of the signal processing. A poor SNR leads to unstable vector geometry and a display read-out which is prone to jitter. The invention can improve the clarity of the received signal at intermediate separations, making the readings more reliable and the display read-out less prone to jitter, thereby increasing the drilling speed and providing more efficient hardware deployment. In practice, the SNR needs to exceed ~6 dB. Commercial sondes typically use a clock source with an accuracy of ~20 ppm. Therefore to maintain the maximum SNR the receiver should phase lock to the sonde carrier frequency to follow any drift in frequency of the sonde.

A key variable which governs SNR is the locate bandwidth, as the amount of noise present in a signal is proportional to the square root of bandwidth. A high integrity receiver should have a noise floor determined by the Johnson noise in the antenna windings only. Other noise sources, such as op-amp voltage noise, digital quantisation and spurious magnetic feedback (a consequence of noise currents in the receiver) are unacceptable if they dominate the intrinsic antenna noise.

In an embodiment of the invention, the output from the spectrum analyser is passed to a matched filter which produces a rank correlation coefficient. The rank correlation coefficient is a measure of the certainty of the sonde being present. Hence the recognition process can be regarded as a matched frequency spectrum correlator.

In an embodiment of the invention, the output from the matched filter is passed to an arbitrator which decides whether the sonde is detectable by the detector or not. The physical parameters governing the ability to successfully arbitrate are the SNR of the carrier and side band peaks, the phase noise and the frequency resolution.

In an embodiment of the invention, the frequency spectrum analyser comprises a CDFT.

In an embodiment of the invention, one of the frequency bins of the frequency spectrum analyser is aligned within 20 mHz of the fundamental frequency of the magnetic signal produced by the sonde, preferably one of the frequency bins of the frequency spectrum analyser is aligned within 10mHz of the fundamental frequency of the magnetic signal produced by the sonde, further preferably one of the frequency bins of the frequency spectrum analyser is aligned within 5 mHz of the fundamental frequency of the magnetic signal produced by the sonde.

The output of the frequency spectrum analyser is comprised of measurements of the fundamental frequency and harmonic frequencies of the magnetic signal produced by the sonde and measurements of noise, allowing SNR measurements to be calculated for the fundamental frequency and some of the harmonic frequencies. Inspection of FIG. 3 shows the SNR at a nominal 70 dB. The modulation scheme, data rate and protocol result in the first side band artefact appearing at ~6 Hz from the carrier frequency. A figure of 70 dB SNR as shown in FIG. 3 represents the situation with a sonde and a receiver in close proximity (~5 m separation). A more challenging scenario arises at a 30 m separation, when achieving a 6 dB SNR is more difficult.

In an embodiment of the invention, the SNR for at least 4 of the harmonic frequencies is greater than 6 dB, preferably the SNR for at least 8 of the harmonic frequencies is greater than 6 dB, further preferably the SNR for at least 16 of the harmonic frequencies is greater than 6 dB.

According to a further aspect of the invention there is provided a method of detecting an oscillating magnetic signal produced by a sonde, the magnetic signal having a fundamental frequency and harmonic frequencies, the method comprising analysing the frequency spectrum of the magnetic signal with a frequency spectrum analyser having frequency bins and an output, wherein the frequency bins of the frequency spectrum analyser are substantially aligned with the fundamental frequency and a plurality of the harmonic frequencies of the magnetic signal produced by the sonde.

Preferably the frequency bins follow frequency variation of the magnetic signal produced by the sonde.

Preferably the output from the spectrum analyser is filtered to produce a rank correlation coefficient.

Preferably the rank correlation coefficient is arbitrated to decide whether the sonde is detectable by the detector or not.

Preferably the frequency spectrum analyser is as a complex discrete Fourier transform.

In an embodiment of the invention, one of the frequency bins of the frequency spectrum analyser is aligned within 20 mHz of the fundamental frequency of the magnetic signal produced by the sonde, preferably one of the frequency bins of the frequency spectrum analyser is aligned within 10 mHz of the fundamental frequency of the magnetic signal produced by the sonde, further preferably one of the frequency bins of the frequency spectrum analyser is aligned within 5 mHz of the fundamental frequency of the magnetic signal produced by the sonde.

Preferably the output of the frequency spectrum analyser being comprised of measurements of the fundamental frequency and harmonic frequencies of the magnetic signal produced by the sonde and measurements of noise, the method comprising measuring the signal to noise ratio of the fundamental frequency and harmonic frequencies, wherein the signal to noise ratio for at least 4 of the harmonic frequencies is greater than 6 dB. Preferably the signal to noise ratio for at least 8 of the harmonic frequencies is greater than 6 dB. Further preferably the signal to noise ratio for at least 16 of the harmonic frequencies is greater than 6 dB.

According to a further aspect of the invention there is provided a computer program for detecting an oscillating magnetic signal produced by a sonde, the magnetic signal having a fundamental frequency and harmonic frequencies, the computer program comprising analysing the frequency spectrum of the magnetic signal induced in an antenna with frequency spectrum analysis having frequency bins and an output, wherein the frequency bins of the frequency spectrum analysis are substantially aligned with the fundamental frequency and a plurality of the harmonic frequencies of the magnetic signal produced by the sonde.

Preferably the frequency bins follow frequency variation of the magnetic signal produced by the sonde.

Preferably the output from the spectrum analysis is filtered to produce a rank correlation coefficient.

Preferably the rank correlation coefficient is arbitrated to decide whether the sonde is detectable by the detector or not.

Preferably the frequency spectrum analysis is performed by a complex discrete Fourier transform.

Preferably one of the frequency bins of the frequency spectrum analysis is aligned within 20 mHz of the fundamental frequency of the magnetic signal produced by the sonde, further preferably one of the frequency bins of the frequency spectrum analysis is aligned within 10 mHz of the fundamental frequency of the magnetic signal produced by the sonde, yet further preferably one of the frequency bins of the frequency spectrum analysis is aligned within 5 mHz of the fundamental frequency of the magnetic signal produced by the sonde.

Preferably the result of the frequency spectrum analysis being comprised of measurements of the fundamental frequency and harmonic frequencies of the magnetic signal produced by the sonde and measurements of noise, the computer program comprising measuring the signal to noise ratio of the fundamental frequency and harmonic frequencies, wherein the signal to noise ratio for at least 4 of the harmonic frequencies is greater than 6 dB, further preferably the signal to noise ratio for at least 8 of the harmonic frequencies is greater than 6 dB, further preferably the signal to noise ratio for at least 16 of the harmonic frequencies is greater than 6 dB.

BRIEF DESCRIPTION OF THE DRAWINGS

Embodiments of the invention will now be described, by way of example, with reference to the accompanying drawings, in which.

DESCRIPTION OF PREFERRED EMBODIMENT

Figure 1:
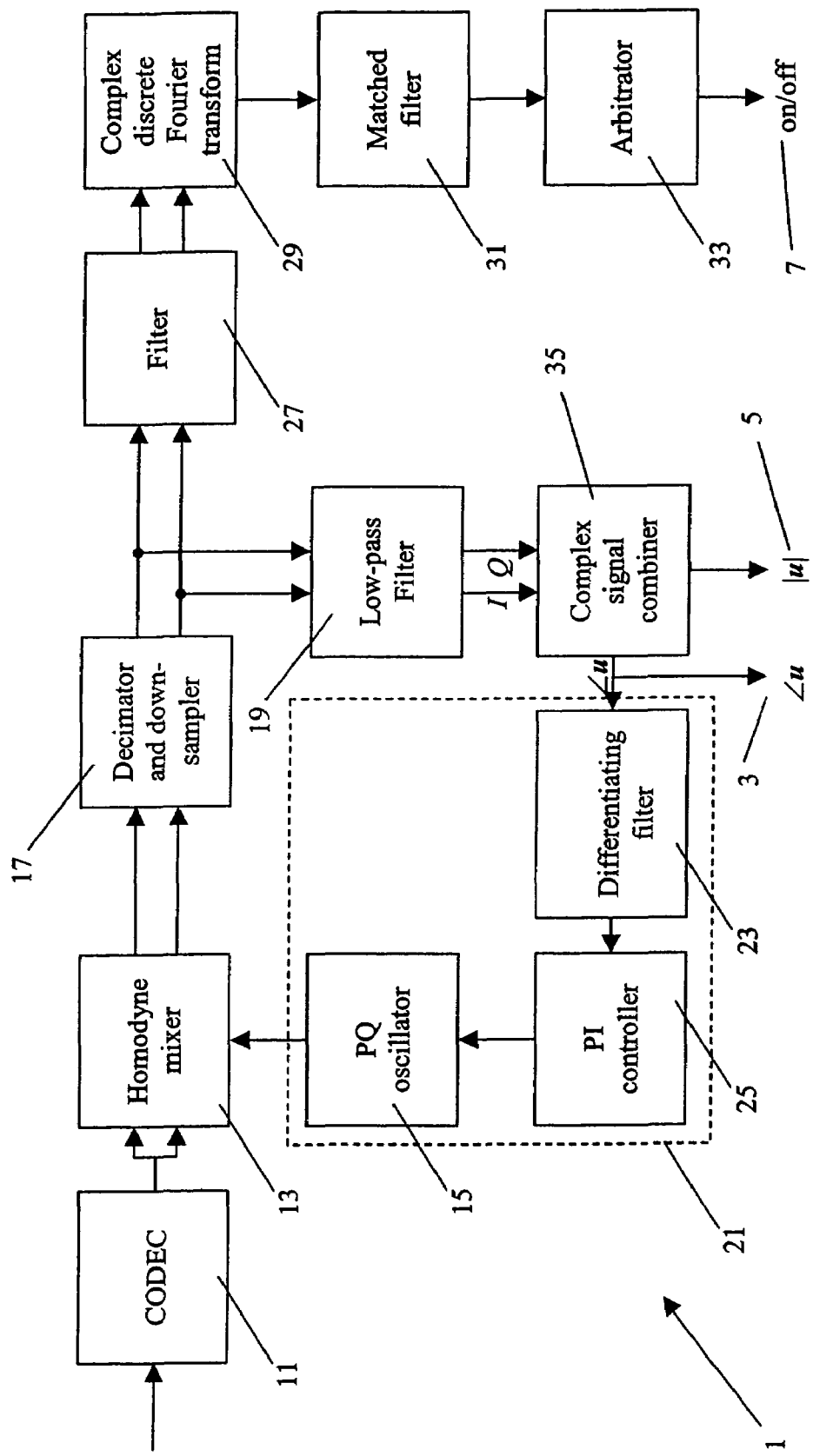
FIG. 1 is an overview block diagram of a signal isolator module of a detector embodying the invention.
Figure 2A:
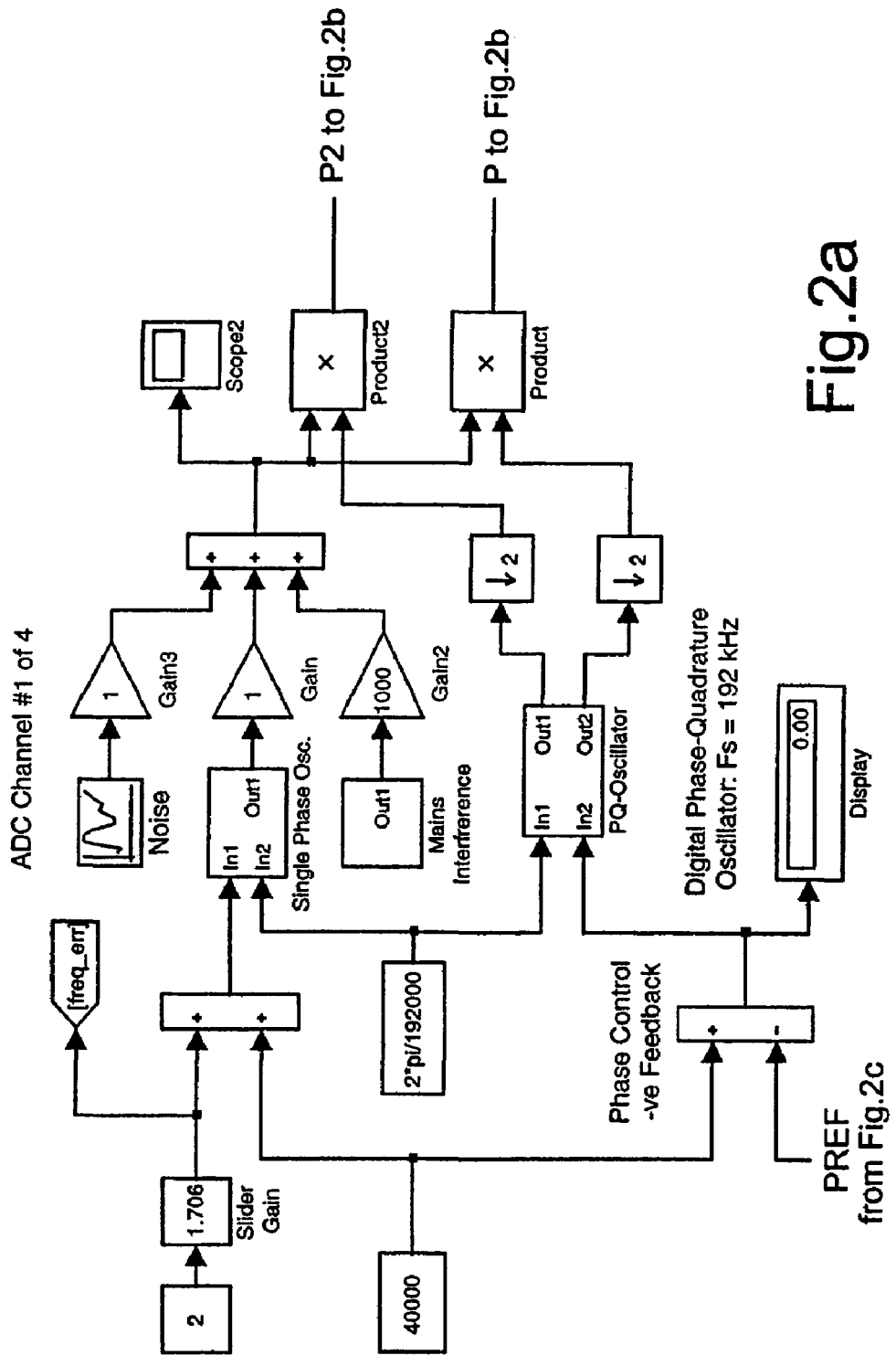
FIGS. 2a, 2b, 2c and 2d are detailed block diagrams of the signal isolator module of FIG. 1.
Figure 2B:
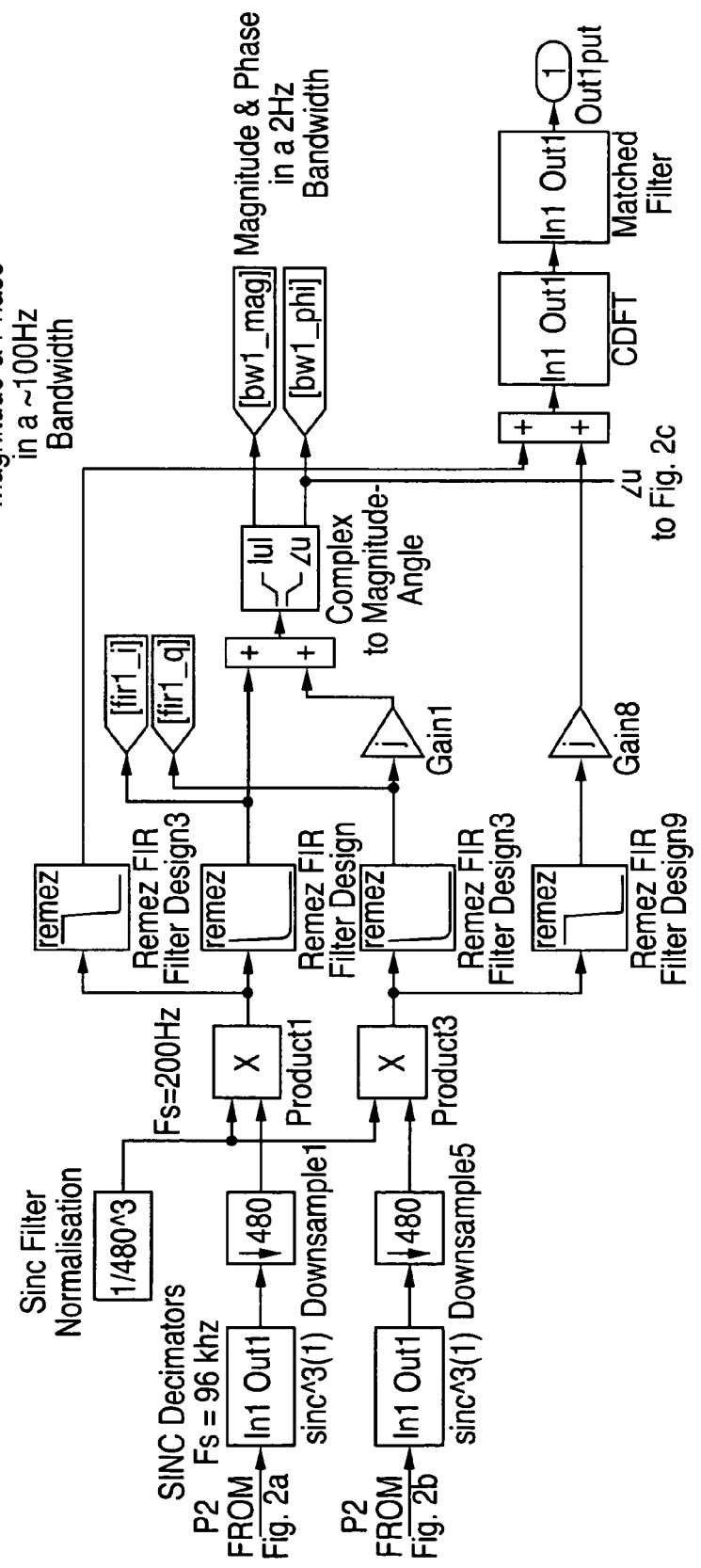
Figure 2C:
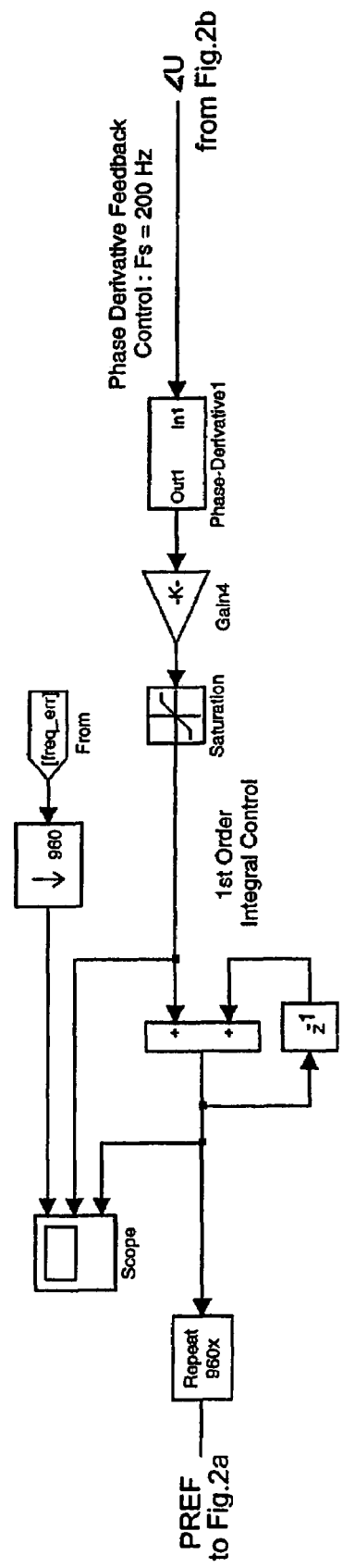
Figure 2D:
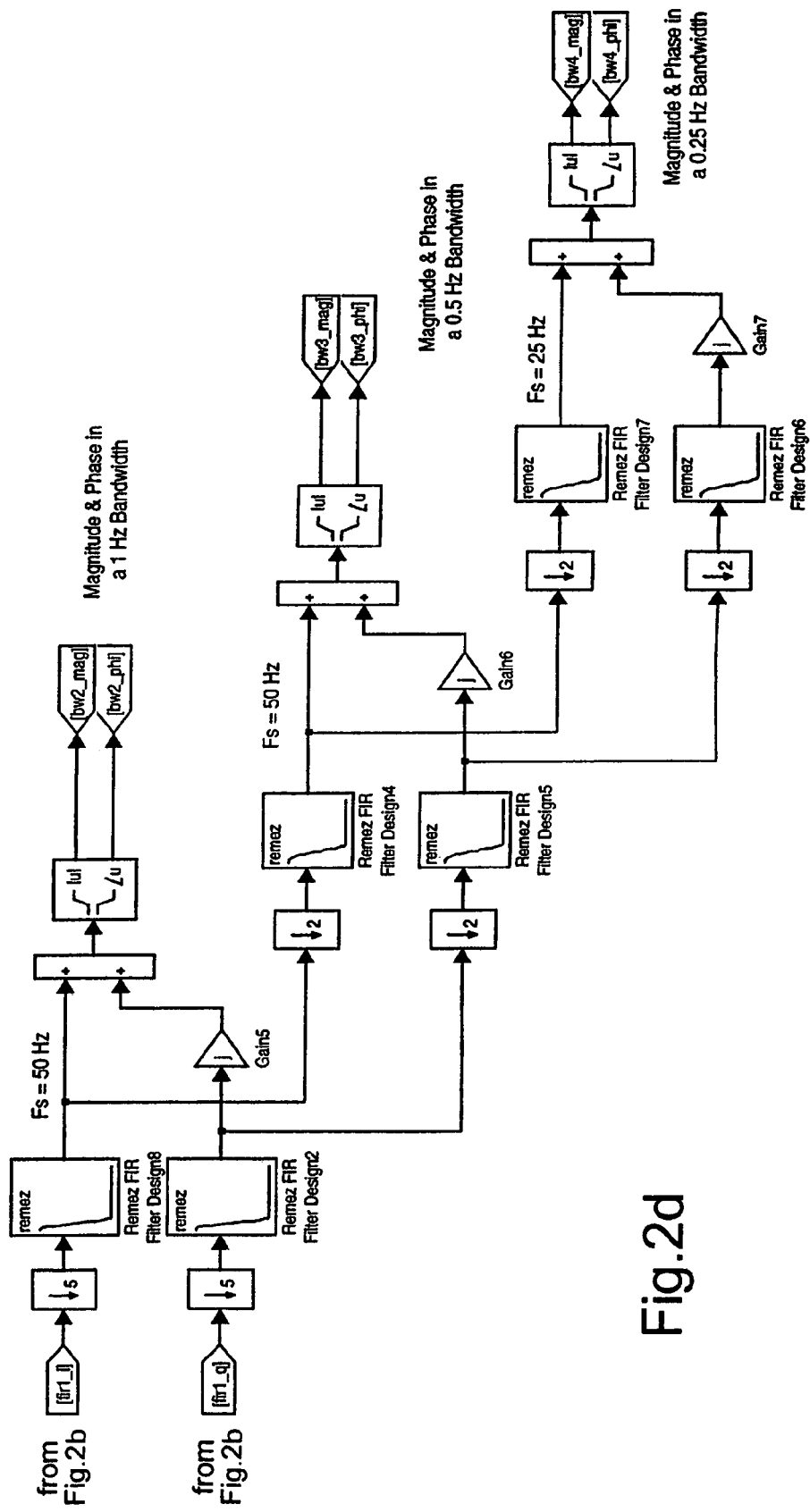

FIGS. 2a to 2d are parts of a Matlab® model of the digital signal isolator module embodying the invention which has been simplified in FIG. 1. A signal isolator module 1 is provided for each receive antenna. To provide accurate location of a sonde, four receive antennas are deployed. More than four receive antennas can be deployed to provide more accurate geometrical resolution, but this would be more expensive, more power hungry and less responsive due to the additional processing required. The signal isolator modules 1 of the detector simultaneously perform the signal processing of the received electromagnetic signals from the analogue outputs 9 of the associated antennas to produce a signal magnitude measurement 3 and a phase angle measurement 5 for the electromagnetic signal induced by the sonde in each antenna. The signal bandwidths are processed down to one of four selectable outputs (2.0, 1.0, 0.5 and 0.25 Hz) as is explained below. The selectivity requirement is −120 dB rejection in the stop bands of these filters. The signal magnitude |u| 3 and phase angle ∠u5 measurements of each of the signal isolator modules 1 are then presented to a geometrical evaluation module (not shown) which determines the relative location of the sonde.

A secondary application for the signal isolator module 1 is to compute a CDFT in a bandwidth of 100 Hz around a defined sonde frequency. The requirement is to provide a reliability measurement 7 for the received signal to determine the integrity of the signal magnitude measurement |u| 3 and phase angle measurement ∠u5.

The processor chosen for the detector is a Texas Instruments TMS320VC33-150. The device is a 32-bit floating point DSP and in this embodiment the processor is clocked at its maximum frequency of 75 MHz. The DSP serves as a slave processor under the full control of a Texas Instruments MSP430 mixed signal processor. The MSP430 is also responsible for boot-loading the DSP. A half duplex synchronous serial bus is used as the communication link between the two processors.

The signal isolator module 1 functions as a homodyne receiver in the band 50 Hz to 40 kHz, whereby the entire bandwidth is sampled by a 24-bit stereo coder-decoder (CODEC) 11 with a maximum sampling frequency of 96 kHz. The CODEC should have a Signal to Noise+Distortion Ratio (S/(N+D)) which exceeds 90 dB referred to a 96 kHz bandwidth. The minimum dynamic range of the converter at this bandwidth should be 100 dB. The receiver is phase sensitive. The CODEC data is memory mapped to the external data bus of the TMS320VC33-150 processor.

Figure 3:
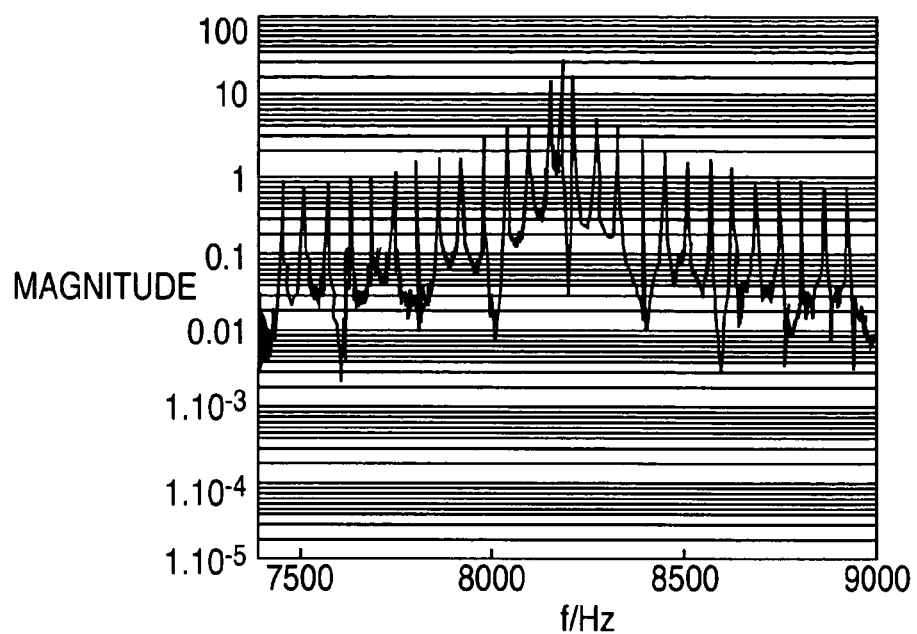
FIG. 3 is a frequency spectrum of a known modulated magnetic signal produced by a sonde.

As stated above, the frequency of oscillation of the magnetic field produced by a sonde is typically between 200 Hz and 83 KHz. In this embodiment, the magnetic field produced by the sonde oscillates sinusoidally at 8192 Hz. This frequency is produced by an oscillator with a stability of better than 20 ppm, giving a frequency accuracy of ±0.16 Hz. The modulation scheme used in this embodiment is 100% "pseudo Manchester bi-phase", as devised by Fling et al and as described in WO/03012483-A1, with data encrypted at 37.5 bps. This 100% modulation scheme transmits either a pure sine wave of 8192 Hz or nothing, and is known as 'bang-bang' modulation. The frequency spectrum of such a modulated signal is shown in FIG. 3. The first side band artefacts appear at ±6 Hz from the carrier frequency.

Each antenna has a passband between 50 Hz and 250 kHz, hence the output from the antenna is a broadband signal containing the sonde signal at 8192 Hz and a large amount of noise. Referring to FIG. 1, an amplified analogue output from the antenna (not shown) is fed into the CODEC 11. The CODEC 11 is based on an oversampling Delta-Sigma ADC which produces a 24-bit output at a sampling rate of 96 kHz. A feature of this CODEC 11 is that it incorporates an anti-alias filter for all signal components above a frequency near to the Nyquist sampling frequency, in this case for all frequency components above ~48 kHz.

The output of the CODEC 11 is split into two paths which are multiplied by a sine and a cosine wave, each of a nominal 8192 Hz, in a homodyne mixer 13. The sine and cosine waveforms are generated in a digital phase-quadrature oscillator 15, as described below, and the oscillating frequency tracks the carrier frequency of the sonde. Both sine and cosine components are used so that the homodyning process preserves the signal phase, when the signals are recombined downstream.

The effect of this mixing on the frequency spectrum of the signals is to produce a frequency sum component and a frequency difference component. The frequency difference component will move the sonde signal from 8192 Hz to DC, so that a narrowband low-pass filter can be used downstream in the device to isolate the sonde signal. The frequency sum component is an unwanted frequency component and when the processed signal is later downsampled, this frequency component aliases in the base-band of the down-sampled bandwidth (~200 Hz). It is essential to find a decimation parameter which ensures that the aliased frequency sum component falls outside the bandwidth of the selective filter (2.0, 1.0, 0.5 or 0.25 Hz) which is applied at a later stage to isolate the signal transmitted by the sonde. Without this constraint the sum term only experiences rejection due to the decimating filter, which is a relatively poor low-pass filter. This in turn would lead to an unstable signal magnitude and phase.

A narrowband-filter computed at the ADC sampling frequency, $F_s$, (96 kHz) would require a massive number of filter taps arid is not realistic. To produce a realisable filter with a frequency response which is highly selective in a narrow bandwidth, it is necessary to decimate the data rate down to ~200 Hz. This is achieved by using a $sinc^m$ decimator and down sampler 17.

The frequency shifted signals are passed to the $sinc^m$ decimator and down sampler 17. A $sinc^m$ decimator is a cascade of m sinc filters and is said to have order m. The $sinc^m$ decimator is simply a moving average filter with N samples in its buffers at any instant in time.

Figure 4:
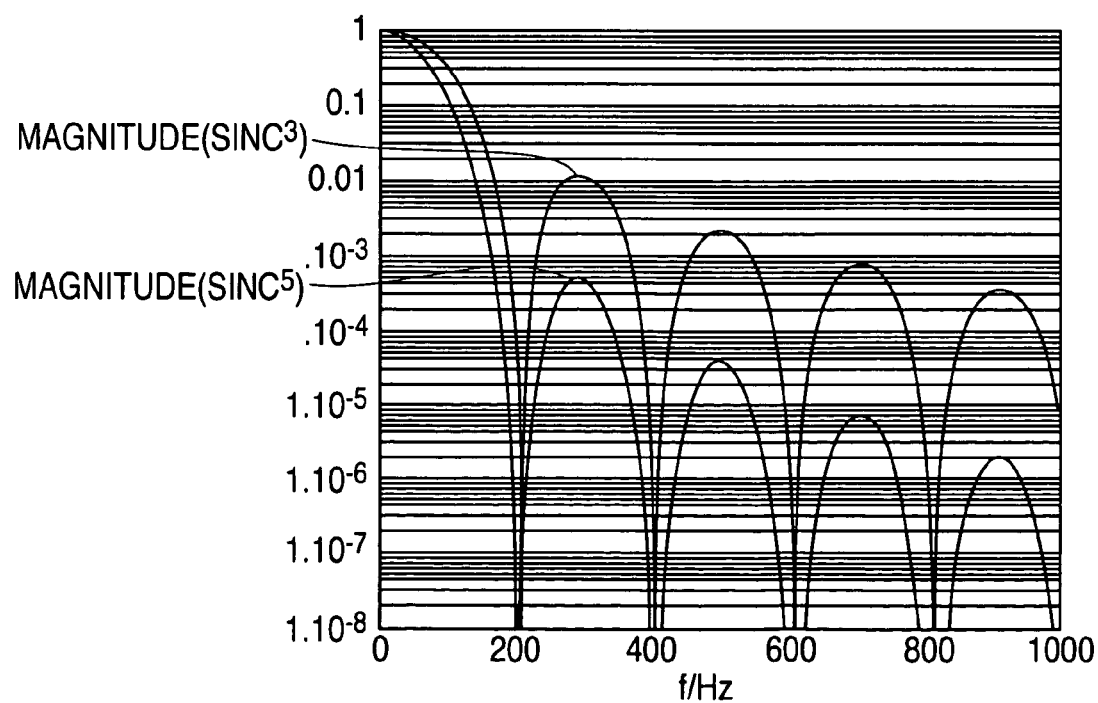
FIG. 4 shows frequency responses of a $sinc^3$ and a $sinc^5$ filter.

To achieve the required selectivity either a $sinc^3$ or a $sinc^5$ decimator is chosen, being a cascade of 3 or 5 moving sum averaging filters respectively, as described in our U.S. application Ser. No. 10/406,597. The choice of which decimator is used will depend on the distance of the detector from the sonde, and this decision is made by the processor. The frequency response of these two filters is shown in FIG. 4. The $sinc^m$ decimator is chosen as it is a function that, when downsampled, gives an aliased spectrum which does not interfere with the required frequency response. FIG. 4 shows that at certain frequencies (in this case for multiples of 200 Hz) the corresponding component of the signal is attenuated. The degree of attenuation increases as the order of the filter increases. When the incoming signal is filtered and then decimated, aliasing causes the side lobes of the filtered signal to fall onto the main lobe. If the decimation parameter (down-sampling ratio), is chosen correctly, the nulls of the frequency response of the $sinc^m$ filter are aliased onto the DC component which represents the sonde signal, leaving the sonde signal unaffected. It is an essential requirement that the decimation parameter is equal to the aperture width, N, of the $sinc^m$ filter. If this requirement is not met, erroneous aliasing and poor selectivity will occur. In this embodiment the sampling rate, $f_s$, is 96 kHz and the aperture width, N, is 480 which gives a decimation parameter of 200 Hz to correspond to the null response region of the $sinc^m$ filter, as shown in FIG. 4.

$Sinc^m$ filters may be implemented by the simple recursive difference equation:

$$y(n)=y(n-1)+x(n)-x(n-N)$$

where:
y(n) is the current filter output
x(n) is the current filter input
y(n−1) is the previous value of the filters output
x(n−N) is filter input delayed by 'N' samples Evaluation of this difference equation reveals a truncation problem caused by the integrating feedback term y(n−1). This eventually leads to integrator wind-up in the summing junction. Over an extended period of iterations, this becomes a significant problem and leads to gain instability in the DSP.

To solve this wind-up problem the $sinc^m$ decimator is computed as a finite impulse response (FIR) filter, which has a transfer function identical to that of a cascade of m moving average filters, but without the recursive term in the computation. The coefficients of this filter are computed at run-time. This approach is justified by the fact that the TMS320VC33 can perform a floating point multiply-accumulate (MAC) in one instruction cycle, which includes incrementing the pointers for the next filter tap. As a decimating filter the FIR only needs to be calculated at the down-sampled data rate (~200 Hz) although the maintenance of its history buffers has to be performed at the full sample rate $F_s$.

In this embodiment, the $sinc^m$ decimator is computed as a FIR by convolving a rectangle aperture of width N samples on itself m times. This simple algorithm is well suited to computation by the DSP at run-time. The FIR filter comprises N.m taps, and the coefficients are calculated as:

$$a_{m,n} = \sum_{k=n}^{n+N} a_{m-1,k}; \text{ where } a_{0,n} = 0 \text{ and } a_{0,N,m} = 1.$$

The output of the $sinc^m$ FIR filter is downsampled by factor N=480 to give a signal with a spectrum which aliases into the first lobe of the frequency response of FIG. 4. This decimation and downsampling is performed simultaneously for the two homodyned signals of each signal isolator module 1 and the resulant signals are output from the decimator and down sampler 17 to a low-pass filter block 19.

The low-pass filter block 19 is comprised of multi-stage cascaded pairs of filters and down-samplers, as shown on the bottom portion of FIG. 2. The number of FIR low-pass filter stages used governs the selectivity of the system and also the response time or inherent lag as seen at the output. The first low-pass filter pair have a 2.0 Hz bandwidth. If greater selectivity is required the two filtered signals are then passed to a second down-sampler which down-samples by a factor of 5 and the down-sampled signals are then filtered by a low-pass filter of 1.0 Hz bandwidth. If further selectivity is required there are two further down-sampling and filter stages which each down-sample by a factor of 2 and low-pass filter to produce an output of 0.5 Hz and 0.25 Hz bandwidth respectively.

The filter coefficients are calculated in Mathcad® using the Reme exchange algorithm and are stored in the DSP 'constant' memory segment. The Remez function implements the Parks-McClellan algorithm, which uses the Remez exchange algorithm and Chebyshev approximation theory to design filters with optimal fits between the desired and actual frequency responses. The filters are optimal in the sense that they minimize the maximum error between the desired frequency response and the actual frequency response. Filters designed in this way exhibit an equiripple behaviour in their frequency response. The Parks-McClellan FIR filter design algorithm accepts filter specifications in terms of passband and stopband frequencies, passband ripple, and stopband attenuation. The MSP430 microcontroller controls the degree of filtering.

The two outputs, from the low-pass filter block 19, I and Q, are combined in the complex signal combiner 35 to produce magnitude |u| and phase ∠u information in accordance with the following equations:

$$|u| = \sqrt{I^2 + Q^2}$$

$$\angle u = \tan^{-1}\left[\frac{I}{Q}\right]$$

Inverse tangent is computed in the first octant and then by applying some simple transformations the remaining angles can be computed to 360°. The transformations are dependent on the relative magnitudes and signs of I and Q. The inverse tangent is itself computed using a truncated polynomial approximation to the exact function. The approximation gives a function which is considerably more efficient than the standard C library function whilst being accurate to ±0.1°. The phase information ∠u for each channel is cast to a 16-bit unsigned integer such that $2\pi \equiv 65536$ and is passed to a phase control feedback loop 21 and the geometrical evaluation module (not shown).

A call to the floating point SQRT function in the standard C library 'math.h' is adequate for magnitude calculation. The magnitude information |u| remains in 32-bit floating point format (IEEE standard 754) and is passed to the geometrical evaluation module. The magnitude |u| 5 and phase information ∠u 3 for each channel is transmitted to the micro-controller at ~200 Hz (the down-sampled data rate).

The phase control feedback loop 21 serves to match the DSP local oscillator 15 (phase-quadrature synthesiser) to the exact sonde frequency. The requirement is to trim the frequency error between the signal isolator 1 and the sonde frequency within a 250 ppm tolerance band.

The frequency error is computed in the differentiating filter 23 as the time derivative of phase (d∠u/dt) computed in an ~8 Hz bandwidth. It is necessary to cast the phase to a 16-bit integer in order to map the natural wrap-around at 2π to a continuous function. The phase error is processed through a simple proportional and integral (PI) controller 25 and the output is used to adjust the seed values in the phase quadrature (PQ) oscillator 15. The PI coefficients are set for dominant integral control law and the loop dynamics are tuned for critical damping. The loop dynamics are dominated by the step response functions of both the decimator and down-sampler 17 and the FIR low-pass filter 19.

Stable control of the feedback loop 21 is achieved by asserting an integral gain of 2/π and a proportional gain of 1/π in the error feedback. This control law leads to a servo mechanism which can 'lock-in' to a negligible error with a response time of 800 ms. The absolute accuracy of the frequency tracking is governed by the resolution of the 32-bit floating point representation—this is typically between 5 and 6 decimal places.

The phase control servo mechanism operates under the control of the MSP430 micro-controller which controls the DSP to either track, hold-track or return to the nominal sonde frequency.

The DSP reports signal magnitude to the MSP430 at a data rate of ~6 Hz. The choice of the applicable bandwidth is the domain of the MSP430. The MSP430 is also responsible for arbitrating the phase reference channel, this decision being based on the largest signal magnitude. A 6 dB hysteresis band is used to avoid rapid channel hopping.

The signals which are output from the decimator and down-sampler 17 are passed to the low-pass filter 19, as described above, and they are also passed to a 100 Hz low-pass filter 27 before being passed to a complex discrete Fourier transform (CDFT) block 29. The idea of the CDFT 29 is to provide a frequency spectrum analyser in a bandwidth of 100 Hz around the nominal sonde frequency in order to verify that the signal which has been isolated by the low-pass filter block 19 originates from the sonde.

As the DSP has already resolved the signal into its in-phase and quadrature components these act as the real and imaginary inputs to the CDFT. The CDFT can be computed at a variable sample rate of between 50 Hz and 1 KHz, allowing a frequency resolution down to 0.01 Hz, but typically a frequency resolution (frequency bin spacing) of 0.1 Hz is used. The frequency bin width is determined by:

$$f_{bin} = \frac{F_s}{N.DEC}$$

where $F_s$ is the ADC sample rate (~96 kHz)

DEC is the decimation ratio (~480)

N is the number of samples in the CDFT

Tuning the frequency bin width to be an exact multiple of the Sonde data rate ensures the sidebands also align with the CDFT. The sample rate and corresponding frequency resolution are determined by the processor on a case-by-case basis based on pre-programmed scenarios.

As the PQ oscillator is servoed onto the sonde carrier frequency, the CDFT is similarly phase locked to the sonde carrier frequency so that the entire bandwidth of the CDFT can 'slide' in the frequency domain. This ensures that the frequency bins of the CDFT are aligned with the fundamental carrier frequency and the harmonic frequencies, leading to enhanced SNR. Put another way the zeros due to the CDFT modulation are coincident with the sonde harmonics. This gives superior performance to an approach using standard window functions. The degree of alignment between the fundamental carrier frequency and the corresponding frequency bin of the frequency spectrum analyser is less than 20 mHz, preferably less than 10 mHz and further preferably less than 5 mHz.

Figure 5:
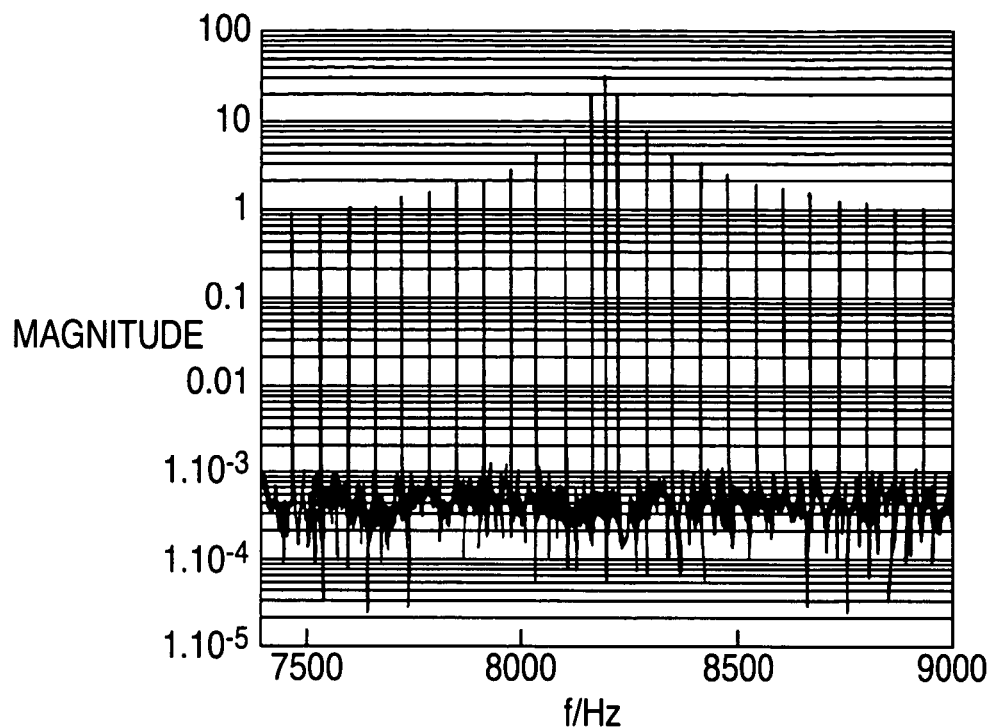
FIG. 5 is a frequency spectrum of a signal which is output from a complex discrete Fourier transform block.
Figure 6:
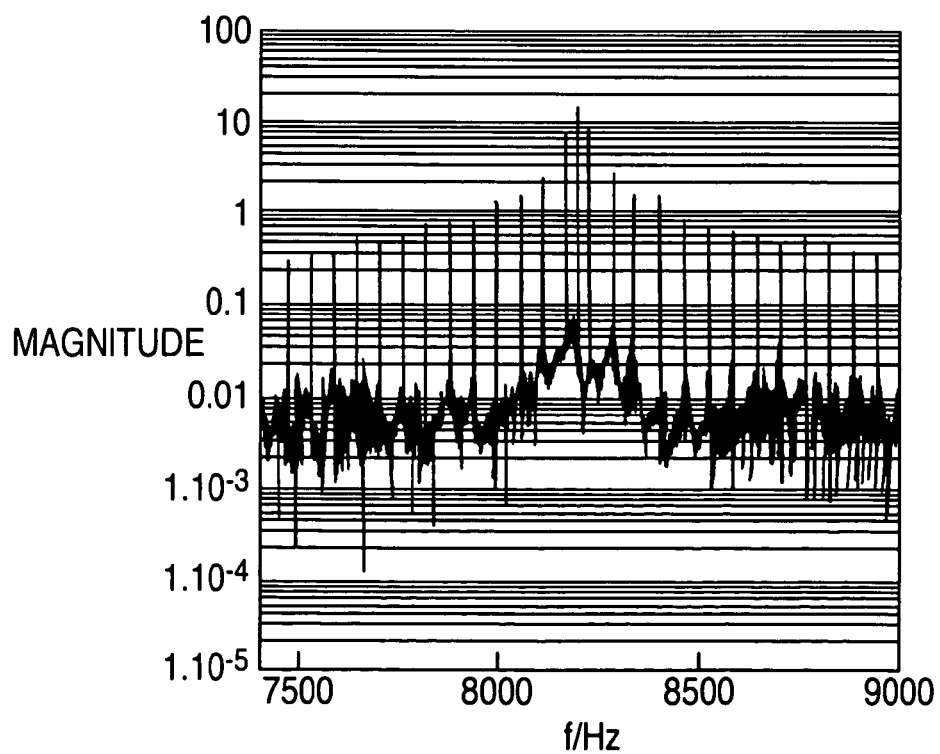
FIG. 6 is a frequency spectrum of a signal which is processed through a fast Fourier transform (FFT) using a Hamming window.

FIG. 5 demonstrates a ~20 dB improvement with respect to the prior art method, where the signal is processed through an FFT using a Hamming window, as shown in FIG. 6.

The output of the CDFT block 29 is passed to a matched filter 31 which determines whether the known sonde spectrum is present in the received electromagnetic signal by looking at the energy in the fundamental carrier frequency and in each harmonic frequency which is identifiable by an SNR of at least 6 dB. The sonde spectrum is correlated against the matched filter 31 as a function of the modulation scheme, data rate and encryption method. The 'sonde present' decision is arbitrated in the arbitrator 33 from a rank correlation coefficient. As a minimum, 5 or 6 harmonic frequencies should have an SNR of at least 6 dB to allow the arbitrator to recognise the sonde. Due to this enhanced SNR of the fundamental and harmonic frequencies, a positive 'sonde present' decision can result at increased separations.

Various modifications will be apparent to those in the art and it is desired to include all such modifications as fall within the scope of the accompanying claims.

The invention claimed is:

1. A digital signal isolator module for detecting an oscillating magnetic signal produced by a sonde, the digital signal isolator module comprising:
an analog-to-digital converter to convert an analog signal, received from an antenna, to a digital signal, the analog signal including fundamental and harmonic frequencies associated with an oscillating magnetic signal; and
a digital signal processor, coupled to the analog-to-digital converter, to process the digital signal, the digital signal processor including a frequency spectrum analyser having an output and frequency bins that are substantially aligned with the fundamental frequency and a plurality of the harmonic frequencies of the magnetic signal.

2. A digital signal isolator module as claimed in claim 1, wherein the frequency bins are adapted to follow frequency variation of the magnetic signal produced by the sonde.

3. A digital signal isolator module as claimed in claim 1, wherein the output from the spectrum analyser is passed to a matched filter which produces a rank correlation coefficient.

4. A digital signal isolator module as claimed in claim 3, wherein the output from the matched filter is passed to an arbitrator which decides whether the sonde is detectable by the detector or not.

5. A digital signal isolator module as claimed in claim 1, wherein the frequency spectrum analyser comprises a complex discrete Fourier transform.

6. A digital signal isolator module as claimed in claim 5, wherein one of the frequency bins of the frequency spectrum analyser is aligned within 20 mHz of the fundamental frequency of the magnetic signal produced by the sonde.

7. A digital signal isolator module as claimed in claim 5, wherein one of the frequency bins of the frequency spectrum analyser is aligned within 10 mHz of the fundamental frequency of the magnetic signal produced by the sonde.

8. A digital signal isolator module as claimed in claim 5, wherein one of the frequency bins of the frequency spectrum analyser is aligned within 5 mHz of the fundamental frequency of the magnetic signal produced by the sonde.

9. A digital signal isolator module as claimed in claim 5, the output of the frequency spectrum analyser being comprised of measurements of the fundamental frequency and harmonic frequencies of the magnetic signal produced by the sonde and measurements of noise, allowing a signal to noise ratio to be calculated for the fundamental frequency and harmonic frequencies, wherein the signal to noise ratio for at least 4 of the harmonic frequencies is greater than 6 dB.

10. A digital signal isolator module as claimed in claim 5, wherein the signal to noise ratio for at least 8 of the harmonic frequencies is greater than 6 dB.

11. A digital signal isolator module as claimed in claim 1, wherein the signal to noise ratio for at least 16 of the harmonic frequencies is greater than 6 dB.

12. The digital signal isolator module of claim 1, wherein the digital signal processor includes:
    a homodyne mixer to process the digital signal received from the analog-to-digital converter;
    a decimator and down sampler coupled to the homodyne mixer;
    a low pass filter coupled to the decimator and down sampler; and
    a complex signal combiner, coupled to the low pass filter, to output magnitude and phase information associated with the oscillating magnetic signal.

13. The digital signal isolator module of claim 12, wherein the digital signal processor includes a phase control feedback loop coupled to the complex signal combiner and the homodyne mixer.

14. A method of detecting an oscillating magnetic signal produced by a sonde, the method comprising:
    converting an analog signal, received from an antenna, to a digital signal, the analog signal including fundamental and harmonic frequencies associated with an oscillating magnetic signal; and
    processing the digital signal, including analysing the digital signal using a frequency spectrum analyser having an output and frequency bins that are substantially aligned with the fundamental frequency and a plurality of the harmonic frequencies of the magnetic signal.

15. A method as claimed in claim 14, wherein the frequency bins follow frequency variation of the magnetic signal produced by the sonde.

16. A method as claimed in claim 14, wherein the output from the spectrum analyser is filtered to produce a rank correlation coefficient.

17. A method as claimed in claim 16, wherein the rank correlation coefficient is arbitrated to decide whether the sonde is detectable by the detector or not.

18. A method as claimed in claim 14, wherein the frequency spectrum analyser is as a complex discrete Fourier transform.

19. A method as claimed in claim 14, wherein one of the frequency bins of the frequency spectrum analyser is aligned within 20 mHz of the fundamental frequency of the magnetic signal produced by the sonde.

20. A method as claimed in claim 14, wherein one of the frequency bins of the frequency spectrum analyser is aligned within 10 mHz of the fundamental frequency of the magnetic signal produced by the sonde.

21. A method as claimed in claim 14, wherein one of the frequency bins of the frequency spectrum analyser is aligned within 5 mHz of the fundamental frequency of the magnetic signal produced by the sonde.

22. A method as claimed in claim 14, the output of the frequency spectrum analyser being comprised of measurements of the fundamental frequency and harmonic frequencies of the magnetic signal produced by the sonde and measurements of noise, the method comprising measuring the signal to noise ratio of the fundamental frequency and harmonic frequencies, wherein the signal to noise ratio for at least 4 of the harmonic frequencies is greater than 6 dB.

23. A method as claimed in claim 14, wherein the signal to noise ratio for at least 8 of the harmonic frequencies is greater than 6 dB.

24. A method as claimed in claim 14, wherein the signal to noise ratio for at least 16 of the harmonic frequencies is greater than 6 dB.

25. A computer program embodied on a computer readable medium for detecting an oscillating magnetic signal produced by a sonde, the computer program comprising:
    receiving a digital signal from an analog-to-digital converter, the digital signal being converted from an analog signal that includes fundamental and harmonic frequencies associated with an oscillating magnetic signal; and
    processing the digital signal, including analysing the digital signal using a frequency spectrum analyzer having an output and frequency bins that are substantially aligned with the fundamental frequency and a plurality of the harmonic frequencies of the magnetic signal.

26. A computer program as claimed in claim 25, wherein the frequency bins follow frequency variation of the magnetic signal produced by the sonde.

27. A computer program as claimed in claim 25, wherein the output from the frequency spectrum analyzer is filtered to produce a rank correlation coefficient.

28. A computer program as claimed in claim 27, wherein the rank correlation coefficient is arbitrated to decide whether the sonde is detectable by the detector or not.

29. A computer program as claimed in claim 25, wherein the frequency spectrum analyzer is a complex discrete Fourier transform.

30. A computer program as claimed in claim 25, wherein one of the frequency bins of the frequency spectrum analyzer is aligned within 20 mHz of the fundamental frequency of the magnetic signal produced by the sonde.

31. A computer program as claimed in claim 25, wherein one of the frequency bins of the frequency spectrum analyzer is aligned within 10 mHz of the fundamental frequency of the magnetic signal produced by the sonde.

32. A computer program as claimed in claim 25, wherein one of the frequency bins of the frequency spectrum analyzer is aligned within 5 mHz of the fundamental frequency of the magnetic signal produced by the sonde.

33. A computer program as claimed in claim 25, the result of said analysing being comprised of measurements of the fundamental frequency and harmonic frequencies of the magnetic signal produced by the sonde and measurements of noise, the computer program comprising measuring the signal to noise ratio of the fundamental frequency and harmonic frequencies, wherein the signal to noise ratio for at least 4 of the harmonic frequencies is greater than 6 dB.

34. A computer program as claimed in claim 25, wherein the signal to noise ratio for at least 8 of the harmonic frequencies is greater than 6 dB.

35. A computer program as claimed in claim 25, wherein the signal to noise ratio for at least 16 of the harmonic frequencies is greater than 6 dB.

* * * * *